Dec. 20, 1955  A. VANG  2,728,045
UTILIZATION OF MAGNETICALLY STORED ELECTRICAL ENERGY
Filed Jan. 15, 1953
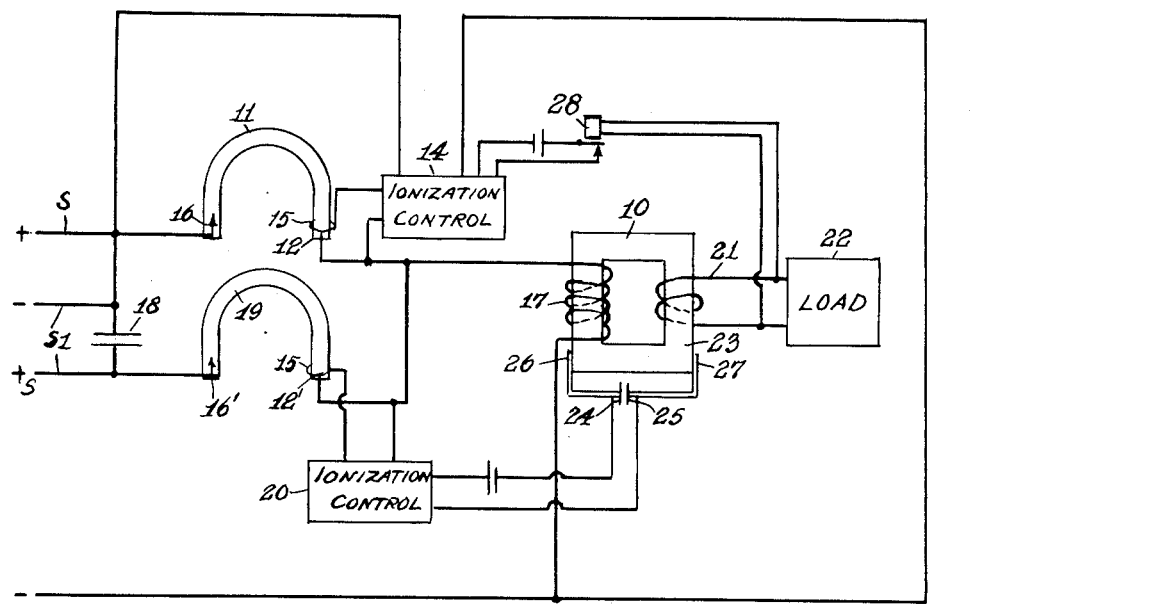
INVENTOR.
ALFRED VANG
BY
ATTORNEY.

2,728,045

UTILIZATION OF MAGNETICALLY STORED ELECTRICAL ENERGY

Alfred Vang, Carmel, Calif.

Application January 15, 1953, Serial No. 331,342

7 Claims. (Cl. 323—58)

This invention relates to utilization of magnetically stored electrical energy for a circuit which normally would result in an operation at an undesirable power factor.

Any work circuit which normally is attended by a poor power factor will normally oscillate at a certain frequency under given conditions. In other words, the circuit has a natural frequency under such conditions. Unfortunately the natural frequency of the circuit is, in practice, not always constant, owing to the variations in the nature of the load in the circuit. Furthermore, with conventional sources of commercial power, the variation of the line frequency is next to impossible so that heretofore no practical attempt has been made to keep line frequency tuned with respect to the natural frequency of the work circuit.

To obtain the efficient use of energy in circuits, I periodically store small quantities of energy in various types of devices, for example, a transformer, which is particularly suited for many types of loads. The primary of the transformer is momentarily connected to a suitable supply of power, and as soon as the iron core of the transformer becomes magnetically saturated the power supply is cut off. The normal nearly complete demagnetization or "un-magnetizing" of the iron (like its magnetization) results in a change of flux threading the secondary. An E. M. F. is produced by the secondary, causing an oscillatory current to flow in the secondary and work circuit. This oscillatory flow continues until the energy supplied momentarily through the primary for magnetizing the iron has been substantially dissipated in the work circuit. The oscillatory flow takes place largely after the primary has been disconnected.

The line source of power is of comparatively high voltage and may be either direct or alternating current. When alternating current of low frequency is employed only the high voltage portions of the voltage curve are picked off. Negative, as well as positive, peak voltage may be used unless the natural frequency of the work circuit is so low or the load so light that the energy of the transformer is not substantially dissipated during the time interval between positive and negative supply peaks.

In the drawing is shown a circuit embodying my invention.

In the invention is shown, a source of current S connected to a transformer 10 with a main mercury vapor discharge tube switch 11 interposed between the transformer and source. The switch 11 is preferably similar to that described in my Patents Nos. 2,287,541, 2,423,858 and 2,432,219 although other mercury vapor switches such as ignitrons may be used.

One of the mercury electrodes, of the tube preferably the cathode 12, is ignited or fired by a known ionization control device 14. The control device supplies a high potential difference to the igniter electrode 15 contiguous to the cathode 12 and the latter. The application of the potential difference or ignition voltage is made to occur in a predetermined time relationship to the needs of the system in a manner described below and is obtained by the use of high voltage oscillating current whose frequency may be varied by conventional means and may be dependent on the state of the transformer. Thus the transformer 10 becomes energized by the current from source S flowing through the ignited tube between electrodes 12 and 16 and in the primary 17 and the action so far described is well known. In the prior art, current continues to flow through the tube until the source S is exhausted, or changes in polarity, or until the load increases to such a value that there is insufficient difference in potential across the tube to maintain the mercury vapor in an ionized condition.

In the prior art it is thus seen that there has been no provision for abruptly stopping, at a predetermined instant, a flow of current through the load, but rather the current must decay and at a rate dependent on the nature of the source S and the system, and the rate of decay and resurgence must be slow enough to allow natural deionization of mercury vapor.

In the present invention the tube 11 is extinguished, even though the potential across it due to the load current be high, by the application of a reverse or "bucking" potential across the tube. The current required to accompany this reverse potential need not be high for the main work or load current need not be interrupted more than long enough to deionize the tube. That length of time does, however, vary according to the temperature of the tube, nature of the electrodes and of course the ionized contents of the tube.

The reverse potential must, of course, be as great as the potential drop in the work circuit across the tube, and there is seldom any ill effect if it greatly exceeds the potential of the source S.

A convenient source of reverse or "blow-out" potential is a charged condenser 18 of opposite polarity connected to the main tube electrodes 12 and 16 through the medium of a second or "blow-out" tube switch 19 similar to the main work tube 11 having anode and cathodes 16' and 12'. The blow-out tube 19 is also ignited by a second ionization-control potential source 20 similar to the control 14. The condenser 18 may be charged at suitable time intervals by a suitable current supply $S_1$ having a potential slightly greater than S. The capacity of condenser 18 may be varied according to the rating of the entire system though for a fixed welding load 400 microfarads is satisfactory.

While as shown the blow-out potential is thrown directly across the work tube 11 it may also pass through the primary 17. If the blow-out current so passes through the primary, it is generally preferable to charge the condenser to a potential $S_2$ appreciably greater than $S_1$.

The rapidity with which the voltage in the transformer can be brought to a maximum and can be collapsed varies with the ratio of the inductance to the resistance of the load. For a load containing a light transformer and where the line voltage is 100 D. C. and the blow-out voltage slightly greater, about 104 volts, the raise time is about 20 micro-seconds and the collapse time from 10 to 5 micro-seconds and below when mercury vapor tubes are employed.

While the source S is indicated as a direct current, the current may be alternating, especially as shown provided the polarity of $S_1$ or $S_2$ is, at a particular instant, such as to throw a reverse blow-out potential across the main tube 11 whatever may be the then existing polarity of the tube 11. In this manner, for instance, only peak energy may be drawn as mentioned above.

While the blow-out tube 19 is greatly superior to other control means for connecting the reverse potential source to the work tube 11, owing to the ruggedness of the tube 19 against flash-back and the like, any means for applying a reverse potential to the electrodes, prior to work current voltage normally returning to near zero, may be employed.

Thus far the transformer 10 has been more or less considered as the load but such is not the case. The transformer is in reality a device in which energy is stored and the true work circuit comprises the transformer secondary 21 and the load 22.

Each pulse of energy delivered to the primary 17 puts the iron core 23 of the transformer under a stress, which rises to a maximum when the core becomes magnetically saturated. It is then that the blow-out tube stops the flow of current to the primary. The saturation point can be determined with reasonable accuracy by the change in physical dimensions or change in conductivity of the core. For instance a contraction of the core will cause shortening of a side so that condenser plates 24, 25 mounted fast to the respective ends thereof 26, 27 will be brought closer together to actuate the control 20. A piezo crystal might be used in place of the condenser.

The magnetically formed distortion of the core disappears with demagnetization and the latter causes a flow of current through the secondary and the load, but the resilience of the iron core as well as a back E. M. F. from the load causes the core to assume a state of vibration. Due to the fact that energy is lost in the load the amplitude of vibration is successively smaller with each oscillation of the load circuit. It is therefore desirable that contacts 24, 25 be so spaced that the control 20 is actuated only when the large deformation by the primary current takes place.

When current substantially ceases to flow from the secondary 21 a relay 28, which remains open during such a flow, closes to activate the control 14 causing another pulse of energy to be delivered to the transformer and the process is repeated.

During all oscillatory flow of current through the load 22 the transformer is disconnected from the line supply. The frequency of the load current has no effect upon the line current.

Thus I may employ a large heavy transformer, supply a high voltage for a short period of time to magnetize the large core, and then disconnect the line supply. The natural frequency of the secondary and load circuit may be very high, and, if the load absorbs little energy, the energy given up by demagnetization will be at a slow rate, and the secondary circuit will continue oscillating for a longer period of time than that required to magnetize the core.

I claim as my invention:

1. In combination, an iron core transformer having a primary and secondary, means for supplying electricity to said primary, and means responsive to the physical change in dimensions of said core for preventing a continuance of the supplying of the electricity to the primary.

2. With a combination as claimed in claim 1, a load connected to the secondary, and means for causing electricity to be supplied to the primary as soon as current substantially ceases to flow between the secondary and load.

3. In combination, a source of main electric current, a transformer having an iron core, a tube switch having ionizable contents and interposed between the source and the primary of the transformer, means for igniting said switch, a second source of current having a voltage higher than that of the main current, and means for selectively connecting said second source across said switch, the polarity of the second source being opposite to that of the switch normally under load, to reverse the polarity of the switch and extinguish same, and means dependent on the degree of magnetization of said core for operating the first mentioned means, the last mentioned means being a condenser having plates secured at separated points fast to the core, and adapted to move toward each other with a decrease in distance between said points.

4. A method for operating an iron core transformer having a primary and a secondary, the latter being connected to a load, the method which comprises connecting a source of electricity to the primary for only a sufficient length of time to substantially saturate the core of the transformer and then disconnecting said source, allowing a current to flow between the secondary and load at the natural frequency of the circuit thereof, and when said current ceases to flow, reconnecting said source to said primary.

5. In combination, a source of electricity, having a positive pole, an iron core transformer having a primary and a secondary, a work mercury discharge-tube switch, the pole being connected to the anode of the switch and the cathode being connected to a side of the primary, a blow-out mercury discharge-tube switch having the cathode thereof connected to said side of the primary, a condenser having one side connected to the anode of the work switch, and the other side connected to the anode of the blow-out switch a first control means for igniting of the work switch, and a second control means for igniting the blow-out switch, a load connected to the secondary, relay means for setting in operation the first control means when current substantially ceases to flow between the secondary and load, and condenser members fast on the core of the transformer at widely separated points thereon and adapted to approach each other when the core material between said points is shortened by magnetization, and means connecting the members to the second control means to actuate the latter.

6. In combination, an iron core transformer having a primary, a source of electricity for said transformer, means for connecting said source to the primary and means responsive to change in dimensions of the core for disconnecting said source.

7. In combination, a source of main electric current, a transformer having an iron core, a tube switch having ionizable contents and interposed between the source and the primary of the transformer, means for igniting said switch, a second source of current having a voltage higher than that of the main current, and means for selectively connecting said second source across said switch, the polarity of the second source being opposite to that of the switch normally under load, to reverse the polarity of the switch and extinguish same, and means dependent on the degree of magnetization of said core for operating the first mentioned means.

References Cited in the file of this patent

UNITED STATES PATENTS

| | | |
|---|---|---|
| 2,030,101 | De Lanty | Feb. 11, 1936 |
| 2,238,185 | Pare | Apr. 15, 1941 |
| 2,361,169 | Bivens | Oct. 24, 1944 |